United States Patent Office 2,703,291
Patented Mar. 1, 1955

2,703,291

CELLULOSE ACETATE COMPOSITIONS CONTAINING 4,7-METHANO-HEXAHYDRO-5-INDANONE

John R. Caldwell, Kingsport, Tenn., assignor to Eastman Kodak Company, Rochester, N. Y., a corporation of New Jersey No Drawing. Application April 15, 1952,
Serial No. 282,461

5 Claims. (Cl. 106—187)

This invention relates to compositions of matter in which cellulose acetate is combined or mixed with a plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions which can be molded at elevated temperatures and high pressures to produce plastic products having the desirable properties of hardness, toughness and elasticity.

I have discovered that valuable properties may be induced in and/or contributed to compositions containing cellulose acetate by adding thereto, as a plasticizing compound, 4,7-methano-hexahydro-5-indanone,

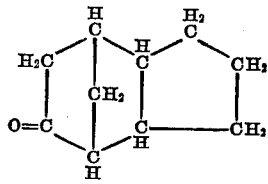

The preparation of this compound is described by Alder and Stein in Ann. 485, 223–246 (1931). The compound boils at 78–80°/2 mm.; $n_D^{20} = 1.5021$.

Not only is my novel plasticizer useful with the ordinary, acetone-soluble, partially hydrolyzed cellulose acetate, containing about 38–40% acetyl, but it is also useful as a plasticizer for the so-called cellulose triacetate, which contains about 43% or more of combined acetyl. It is well known that cellulose triacetate has solubility properties very different from those of partially hydrolyzed cellulose acetate. A number of volatile solvents for cellulose triacetate are known in the art, for instance, those shown in U. S. Patents 2,492,977 and 2,492,978, of Fordyce and Gramkee. While a large number of plasticizers are known for acetone-soluble cellulose acetate, very few satisfactory plasticizers are known for cellulose triacetate.

In order that those skilled in this art may better understand my invention I would state, by way of illustration, that for the manufacture of photographic film base or other sheets my new compositions of matter may be compounded as follows: 100 parts by weight of cellulose acetate is dissolved in any suitable solvent for the type of cellulose acetate being used, and from 15 to 60 parts by weight, preferably 25 to 50 parts by weight, of 4,7-methano-hexahydro-5-indanone, is incorporated in the solution. Within the limits stated, the amount of plasticizer may be decreased or increased, depending upon whether it is desired to decrease or increase, respectively, the properties which this plasticizer contributes to the finished product. The amount of volatile solvent employed may also be varied in accordance with the consistency of the composition desired. The cellulose acetate used may be either the acetone-soluble variety, or cellulose triacetate.

A composition of matter prepared as above described may be deposited upon any suitable film-forming surface and the solvent evaporated therefrom to form a film or sheet, in a manner well known to those skilled in the art. A film so produced has permanently brilliant transparency and low flammability. Films or sheets produced in accordance with my invention are very tough and flexible, and maintain flexibility in a superior fashion.

My novel plasticizer may also be advantageously used in molding compositions of the acetone-soluble type of cellulose acetate. For instance, about 25 to 100 parts of the plasticizer, depending on the hardness or softness of the plastic desired, may be homogeneously mixed with 100 parts of cellulose acetate, for instance by working on hot rolls, and the mixture converted into a transparent or translucent plastic product by molding at a temperature of 140–160° C. and a pressure of 2500 to 4000 pounds per square inch for a period of from 2 to 5 minutes, in a manner well known to those skilled in molding compounds of that nature. The softer plastics may be extruded through a die, or injection molded. Pigments, antioxidants, mold lubricants, etc. may be included in the composition if desired.

As an illustration of a molding composition for injection molding, in which my novel plasticizer is used, I give the following example.

*Example.*—One hundred parts by weight of cellulose acetate having an acetyl content of 39.8% and 40 parts by weight of 4,7-methano-hexahydro-5-indanone were mixed on heated rolls, and the product was granulated. It was injection molded at 320–350° F. The molded product showed the following properties:

| | |
|---|---|
| Hardness | (15X–51.5) Rockwell. |
| Impact strength | 1.4 ft.-lb./in. notch. |
| Elongation | 14.4%. |
| Modulus of elasticity | 2.4 lbs./sq. in. |
| Flexural strength | 10,600 lbs./sq. in. |
| Weight loss on heating | 72 hrs. at 82° C., 2.0%. |
| Water absorption | 24 hrs. at 25° C., 5.0%. |
| Soluble matter lost | 0.24%. |
| Heat distortion | 12% elongation at 137° C. |

What I claim as my invention and desire to be secured by Letters Patent of the United States is:

1. A composition of matter comprising a cellulose acetate and 4,7-methano-hexahydro-5-indanone as a plasticizer therefor.

2. A transparent, flexible sheet comprising a cellulose acetate and 4,7-methano-hexahydro-5-indanone as a plasticizer therefor.

3. A transparent, flexible sheet comprising acetone-soluble cellulose acetate and 4,7-methano-hexahydro-5-indanone as a plasticizer therefor.

4. A transparent, flexible sheet comprising cellulose triacetate and 4,7-methano-hexahydro-5-indanone as a plasticizer therefor.

5. A molding composition adapted for molding under elevated temperatures and high pressures, comprising acetone-soluble cellulose acetate and 4,7-methano-hexahydro-5-indanone as a plasticizer therefor.

References Cited in the file of this patent

UNITED STATES PATENTS

| | | |
|---|---|---|
| 900,204 | Raschig | Oct. 6, 1908 |
| 2,327,007 | Bent | Aug. 17, 1943 |
| 2,337,508 | Tinsley | Dec. 21, 1943 |

FOREIGN PATENTS

| | | |
|---|---|---|
| 14,042 | Great Britain | July 3, 1901 |
| 508,592 | Germany | July 13, 1933 |

OTHER REFERENCES

Dr. Alexander Wacker, Gesellschaft fur electrochemische Industrie G. m. b. H. in Munchen.